(12) United States Patent
Bauer

(10) Patent No.: US 7,062,985 B2
(45) Date of Patent: Jun. 20, 2006

(54) LINEAR GUIDE UNIT

(75) Inventor: Siegfried Bauer, Massbach-Volkershausen (DE)

(73) Assignee: Rexroth Star GmbH, Schweinfurt (DE)

( * ) Notice: Subject to any disclaimer, the term of this patent is extended or adjusted under 35 U.S.C. 154(b) by 254 days.

(21) Appl. No.: 10/349,708

(22) Filed: Jan. 23, 2003

(65) Prior Publication Data

US 2003/0136207 A1     Jul. 24, 2003

(30) Foreign Application Priority Data

Jan. 24, 2002   (DE)   ................ 102 02 737

(51) Int. Cl.
*F16H 27/02* (2006.01)
(52) U.S. Cl. ........................ 74/89.32; 384/42
(58) Field of Classification Search ............ 74/89.32, 74/89.4; 384/42
See application file for complete search history.

(56) References Cited

U.S. PATENT DOCUMENTS

| 5,785 | A | * | 9/1848 | Ung et al. ................ 251/319 |
| 3,745,840 | A | * | 7/1973 | Guralnick ................ 74/89.32 |
| 4,693,131 | A | * | 9/1987 | Teramachi ............... 74/89.32 |
| 5,373,751 | A | * | 12/1994 | Katahira ................. 74/89.32 |
| 5,445,045 | A | * | 8/1995 | Nagai et al. ............ 74/490.09 |
| 5,505,104 | A | * | 4/1996 | Takei ..................... 74/490.09 |
| 5,735,174 | A | * | 4/1998 | Enomoto ................. 74/89.32 |
| 5,974,904 | A | * | 11/1999 | Dirschbacher et al. .... 74/89.32 |
| 6,315,451 | B1 | * | 11/2001 | Michioka et al. .......... 384/42 |
| 6,472,778 | B1 | * | 10/2002 | Keller .................... 310/12 |
| 6,485,178 | B1 | * | 11/2002 | Koban .................... 384/39 |

FOREIGN PATENT DOCUMENTS

DE      197 38 988 A1     3/1998
DE      100 02 849 A1     8/2001

* cited by examiner

*Primary Examiner*—David Fenstermacher
(74) *Attorney, Agent, or Firm*—Michael J. Striker

(57) ABSTRACT

In a linear guide unit that has an elongated guide housing which limits a guide hollow space with a longitudinal opening, a wagon arrangement which is displaceably guided in the guide hollow space on guide rails, a connection part for connecting the wagon arrangement to an object to be guided, a cover element arranged between movement tracks of the connection part and covering the longitudinal opening, in accordance with the present invention forwardly of and/or rearwardly of the wagon arrangement, at least one support unit is arranged displaceably in direction of the longitudinal axis for supporting the cover element relative to the guide housing; also additionally or alternatively the support unit can support the cover element relative to the wagon arrangement.

12 Claims, 4 Drawing Sheets

LINEAR GUIDE UNIT

BACKGROUND OF THE INVENTION

The present invention generally relates to linear guide units.

More particularly, it relates to a linear guide unit which has an elongated guide housing with a longitudinal axis and with walls which limit a guide hollow space and has free ends which limit at least an longitudinal opening of the guide hollow space, two guide rails provided in the guide hollow space each for displaceably guiding a wagon in direction of the longitudinal axis, a connection unit for connecting the wagons to a wagon arrangement, a connecting part extending through the longitudinal opening and connecting the wagons to an object to be guided in direction of the longitudinal axis, and a cover element arranged between movement tracks of the connection part and covering connection units of the guide housing located at its ends and also the longitudinal opening.

Such a linear guide unit is disclosed for example in the German patent document DE 197 38 988 A1. With this linear guide arrangement the cover element is held with a pulling stress on the connection units of the guide housing located at the ends. Thereby a sagging of the cover element must be prevented, since the wagon arrangement otherwise during its movement on the cover plate would slide at least over a part of its movement path, which would lead to an undesirable noise generation during the operation of the linear guide unit. It has been shown however in practice that setting of the cover element under the pulling stress represents an efficient measure against a sagging of the cover element only to a certain maximum length. For long linear guide units the cover element slides on the wagon arrangement.

SUMMARY OF THE INVENTION

Accordingly, it is an object of the present invention to provide a linear guide unit which is a further improvement of the existing linear guide units of this type.

More particularly, it is an object of the present invention to provide a linear guide unit which in the case of great structural lengths generates a low noise or no noise at all.

In keeping with these objects and with others which will become apparent hereinafter, one feature of the present invention resides, briefly stated, in a linear guide unit in which before or/and after the wagon arrangement, at least one supporting unit is provided which is displaceable in direction of the longitudinal axis and supports the cover element relative to the guide housing, and/or a support element is provided on the connection unit and supports the cover element relative to the wagon arrangement.

By means of these support units, the non supported free path lengths of the cover element can be maintained so small, that a sagging of the cover element due to gravity between two neighboring support units, which can represent the danger of a sliding contact with the wagon arrangement, must not be feared anymore. As known from German patent document DE 197 38 988 A1, the cover element can be held with a pulling stress between the end connection units to further reduce this danger.

It is to be understood that the connection of the wagons by the connection unit to a wagon arrangement can be obtained also by a one-piece construction. For example the wagon arrangement can be produced from an aluminum extrusion profile with inserted plates of steel.

For further reduction of noise generation, in particular during movement of the supporting units along the cover element, at least one sliding element can be provided between the at least one supporting unit and the cover element. For example, the sliding element can be arranged on the supporting unit, wherein in addition felt can be used as cost-favorable material for the slide element.

The inventive supporting unit can be used for example with linear guide devices, whose drive device for movement of the wagon arrangement in direction of the longitudinal axis includes a rod unit which is a in driven alternating connection with the rod arrangement or is bringable into such a connection. For example the linear unit can be driven by a roll body thread drive with a threaded spindle as the rod unit. Alternatively, the linear unit can be a magnetic piston unit with a runner which is arranged reciprocatingly movable along a rod, wherein the rod is formed as a hollow tube in which a magnetic piston is displaceable under the action of pressure fluid, and the runner is connected with the piston by magnetic forces. As a further alternative, the linear unit can be formed as a linear module with a runner which is arranged reciprocatingly movable around a rod, wherein the rod is formed as a displacement rod of a linear motor driven by the runner.

In all embodiments the support unit can be connected with a support arrangement or formed of one piece with it, for supporting the rod unit relative to the guide housing. The support arrangement can be formed for example as in German patent document DE 100 02 849 A1, whose complete content is incorporated here by reference for completion of the disclosure of the present application.

In accordance with a further embodiment of the invention, the support unit can have a substantially T-shaped construction in a section which is perpendicular to the longitudinal axis. Thereby with a relatively low space consumption by means of the vertical web of the T-shape, a broad support for the cover element can be provided by the transverse web of the T-shape. When the free ends of the transverse web of the T-shape in addition engage in associated grooves of the cover element, preferably in a form-locking manner, then the cover element can be thereby secured not only against a gravity-related sagging.

With the engagement of the transverse web of the T-shape into the grooves of the cover element it is further possible to secure it against lateral displacements. Whereby an undesirable engagement with the connection parts of the wagon can be prevented. A lifting of the cover element can be stopped with this engagement. Therefore the inventive linear guide unit can be mounted for example also in an overhead position. For further noise reduction, sliding elements can be provided on the engaging surfaces on the free ends of the transverse web of the T-shape with the grooves of the cover element, for example with felt elements.

In accordance with a further embodiment of the present invention a linear guide unit has an elongated guide housing with a longitudinal axis and with walls which limit a guide hollow space and has ends which limit at least one longitudinal opening of the guide hollow space, at least one guide rail in the guide hollow space for displaceably guiding a wagon in direction of the longitudinal axis, connecting part extending through the longitudinal opening and connecting the wagon in direction of the longitudinal axis to an object to be guided, and a cover band which covers the movement path of the connecting part in direction of the longitudinal axis before or/and after the wagon.

In this linear unit the cover band can have a substantially U-shaped cross-section with the free legs of the U-shape which are for example notched or toothed. With this notched or toothed construction, the cover band obtains a higher stability that assists in preventing in particular a displacement of the cover band in the guide hollow space due to application of outer force. When the longitudinal grooves which receive the side edges of the cover band correspond to the geometry of the angle side edges, the above mentioned guiding stability can also be secured by the form-locking cooperation of the free ledges of the U-shape with the guide groove.

A further feature of the invention deals with a mounting of the cover band on the wagon. When the base part for mounting a free end of the cover band on the mounting unit which operates as a wagon and the holding part of the mounting unit are connected of one piece with one another, for example by an elastic web, the mounting of the cover part on the wagon is significantly simplified since the mounting part can not be lost and must not be handled in a special way.

In accordance with a further feature of the present invention, a stripping unit is provided on at least one of the end connection units of the guide element, for stripping dirt which is located in the cover band. The stripping unit can be provided with an inclined surface which is set as a blade against the surface of the cover band.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
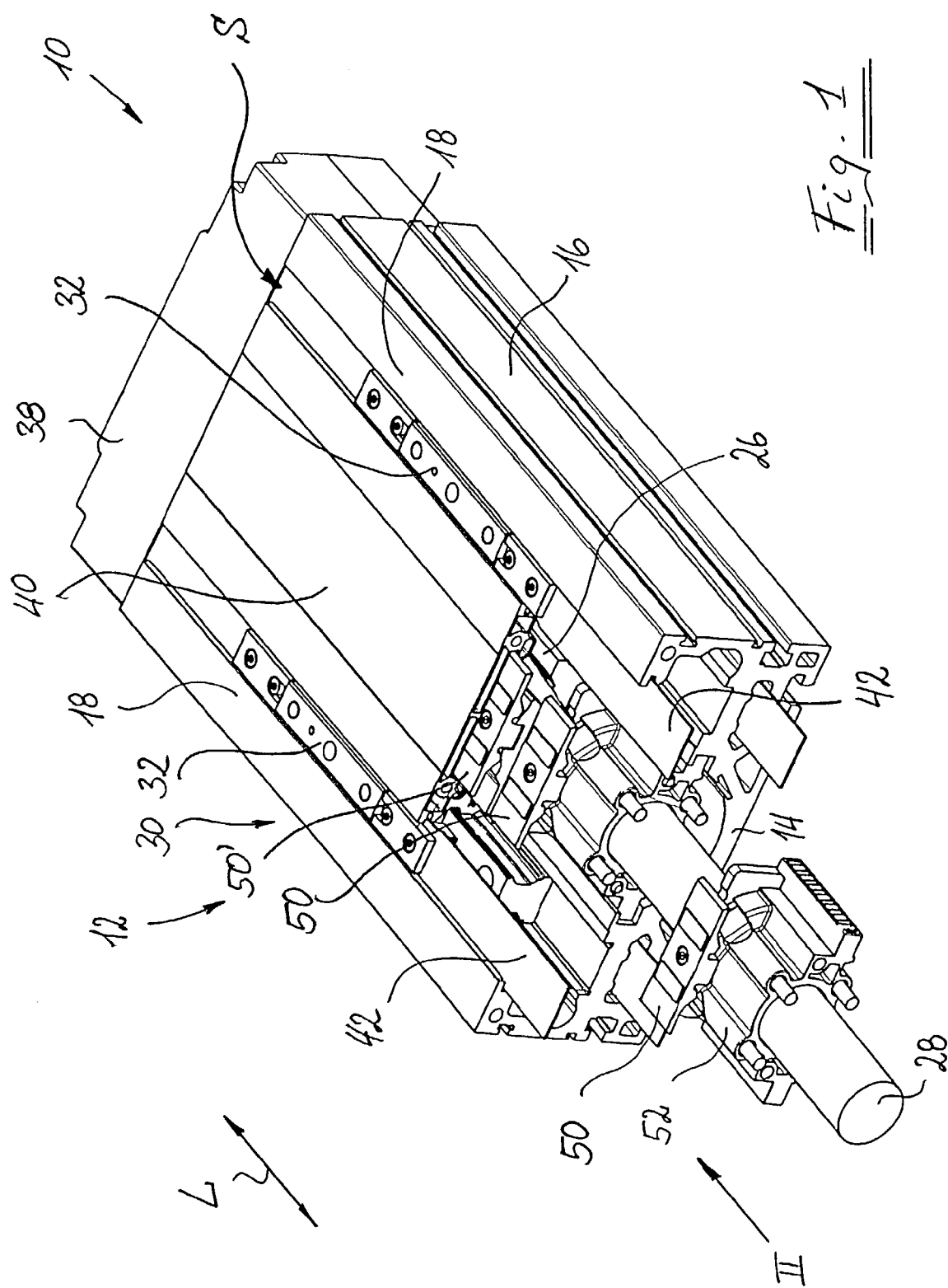
FIG. 1 is a perspective, partially sectioned view of a linear guide unit in accordance with the present invention.
Figure 2:
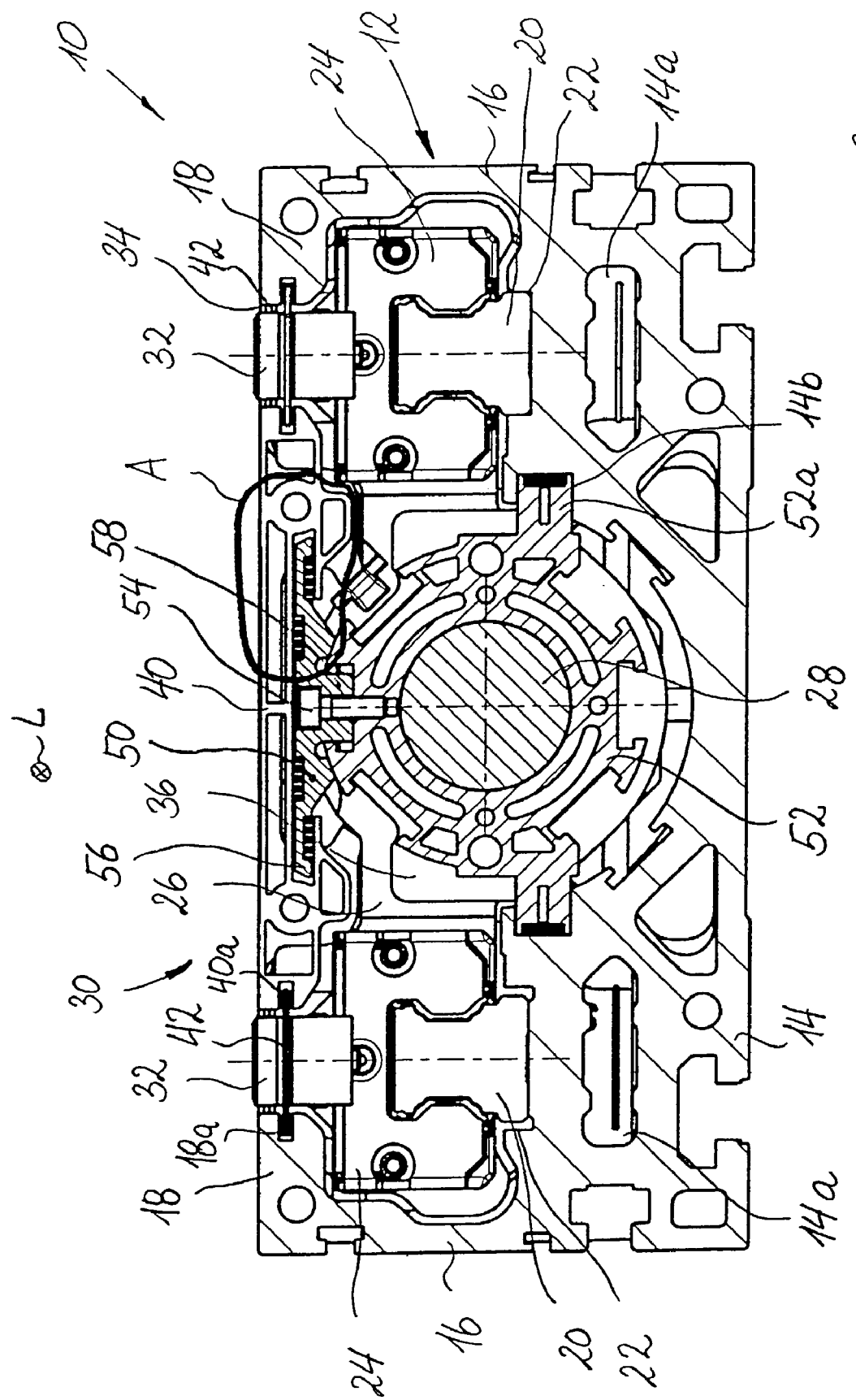
FIG. 2 is an end view of the linear guide unit of FIG. 1, as seen in direction of the arrow 2 in FIG. 1.

FIGS. 1 and 2 shows an inventive linear guide arrangement which is identified as a whole with reference numeral 10. It includes a guide housing 12 with a bottom wall 14 and two side walls 16 provided on its free ends with upper edge flanges 18 which are oriented toward one another. Guide rails 20 are received in guide grooves 22 on the bottom wall 14 of the guide housing 12. The base of the left guide rail 20 in FIG. 2 is laterally movably received in a longitudinal groove 22 to avoid double fits, as known for example from German patent document DE 197 28 988 A1.

The guide rails 20 are mounted on the bottom wall 14 by a not shown bolts with bolt heads arranged so that they sink in sunk openings of the rail head surface. A wagon 24 is rollingly guided on each guide rail 20. The construction and the operation of the wagons 24 are known and therefore not described in detail.

The wagon 24 of the left side and the wagon 24 of the right side are connected by a connection yoke 26 that can be made of one piece with the main bodies of the wagons 24. The connection yoke 26 receives a ball screw nut of a spindle drive with a fixed seat, whose thread spindle 28 extends in a longitudinal direction L of the linear guide unit 10. The threaded spindle 28 is set in rotation by a not shown motor around its axis which extends parallel to the longitudinal direction L. Thereby with interposition of the thread nut the wagon arrangement 30 formed by the wagons 24 and the connecting yoke 26 can be reciprocatingly moved in a longitudinal direction L of the linear guide unit 10.

A connecting part 32 is mounted on each wagon 24. It extends outwardly through the longitudinal openings 34 of the guide housing 12, which is limited by both edge flanges 18. The connecting parts 32 serve for connection of objects to be guided by the linear guide unit 10 for example tools.

Some covering features are provided for protecting an inner space 36 which is surrounded by the guide housing 12 from penetration of dust, in particular particles. First of all, a cover profile 40 is mounted on the end connecting units 38 of the guide housing 12 preferably with a pulling force, to cover the longitudinal openings 34 between the movement paths of the connecting parts 32. Secondly, cover bands 42 are mounted on the connecting parts 32 for covering the movement paths of the connecting parts 32 in the longitudinal direction L before or after them. The cover bands 42 are guided in longitudinal grooves 18a and 40a of the edge flanges 18 of the guide housing 12 and the cover profile 40. Furthermore, the cover bands 42 in the region of the end connecting units 38 slide around the not shown deviating rollers and are guided back through recesses 14a in the bottom of the right housing 12 to each other end of the connecting part 32.

The above described inventive linear guide unit 10 with the features specified above corresponds with its construction and operation to the known linear guide unit which is disclosed in German patent document DE 197 38 988 A1. In order to complete the description, in particular with respect to the description of details of the construction and operation, this German reference DE 197 38 988 A1 is here incorporated as a reference.

In accordance with the present invention before and/or after (in front of and/or behind of) the wagon arrangement 30, supporting units 50 are provided for preventing a gravity-caused sagging of the cover profile 40 in long linear guide units 10, in particular linear guide units with a length more than 1.8 m. The supports unit 50 are mounted in the shown embodiment on its support arrangements 52 which support the thread spindle 28 on the guide housing 12. For this purpose the support arrangement 52 engage with the edge flanges 52a in corresponding longitudinal grooves 14b of the bottom wall 14 of the guide housing 12.

The support arrangements 52, with their substantial structural features and their functions, in particular concerning the "take off" and "pick up" by the wagon arrangement 30, are formed as disclosed in the German patent document DE 100 02 849 A1, which for completion of the description of the present application is incorporated here as a reference.

Figure 3:
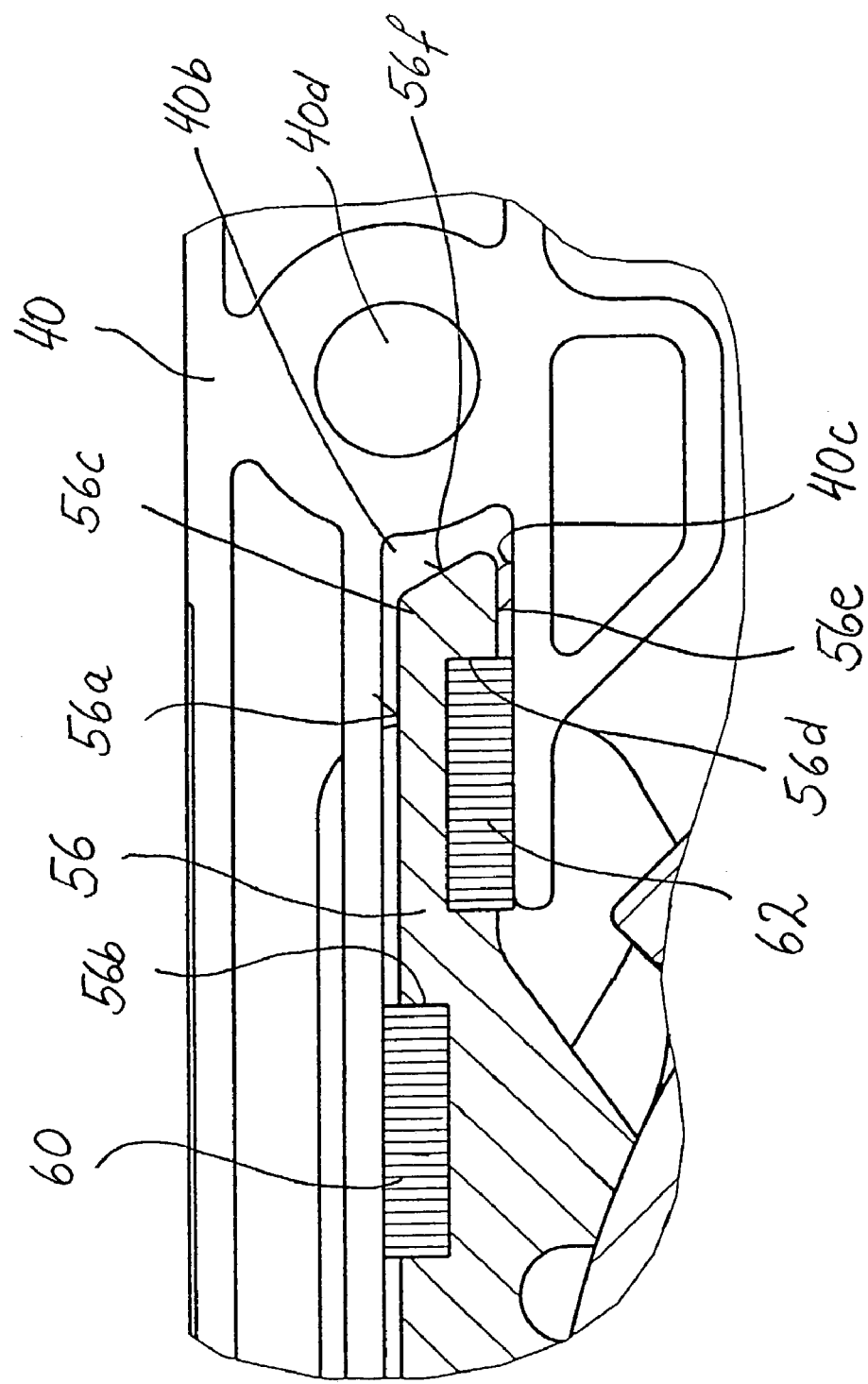
FIG. 3 is a view showing a detail A of FIG. 2 on an enlarged scale

As can be seen in particular from FIG. 2, the support units 50 are mounted on the support arrangements 52. The support units 50 are substantially T-shaped and have a transverse web 56 and a vertical web 58. The vertical web 58 serves for mounting the support unit 50 on the support arrangement 52, while the transverse web 56 serves for supporting the cover profile 40. As can be seen in particular from FIG. 3, felt slide elements 60 an the upper side 56a of the transverse web 56 are received in receiving depressions 56b which are in sliding contact with the cover profile 40.

Thereby the cover profile 40 on the one hand prevents sagging due to gravity force and on the other hand prevents a noise generation by the relatively cost favorable material felt when the support unit 50 together with the wagon arrangement 30 move along the cover profile. Supplementary an inventive support unit 50' can be also arranged on the wagon arrangement 30, in particular the connection yoke 26.

The transverse web 56 of the support unit 50 has free ends 56c (only one shown in FIG. 3), and engages with the free ends into a longitudinal groove 40b of the cover profile 40. It is to be understood that in the region of the free end 56c, sliding elements 60 can be provided for supporting the cover profile 40 against a gravity-caused sagging. In the embodiment shown in FIG. 3, in the region of the free ends 56 a further felt sliding element 82 is received in a recess 56d of the lower side 56e of the transverse web 56. It is in sliding and supporting contact with a counter surface 40c of the longitudinal groove 40a of the cover profile 40.

Based on the above described construction, the support unit 50 can support the cover profile 40 from gravity-caused sagging not only in the orientation shown in the drawings, but also in an overhang orientation, or in other words with the downwardly facing longitudinal opening 34. Finally, it is also possible to provide further sliding elements, which are not shown in the drawings, in the region of the lateral limiting surface 56f of the transverse web 56. They avert a danger of a lateral displacement of the cover profile 40 relative to the support unit 50 and thereby relative to the wagon arrangement 30.

While felt is proposed as the material for sliding element 60 and 62, it is believed to be understood that also other suitable materials can be used for forming the sliding elements, for example TEFLON.

Additionally, the lug 40d serves for mounting of the cover profile 40 on the connection parts 38. Furthermore, the box-shaped construction of the cover profile 40 with its hollow profile sections increases the strengths and thereby reduces the tendency for sagging of the cover profile 40.

Figure 4:
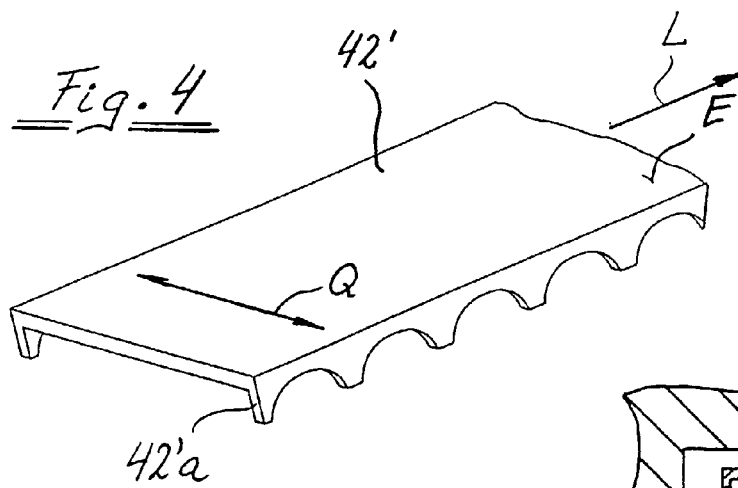
FIG. 4 is a perspective view of a U-shaped cover band of the inventive linear guide unit.

In accordance with the present invention instead of the cover band 42 which is substantially flat and showed in FIG. 1, a U-shaped cover band 42' can be used as shown in FIG. 4. With the cover band 42', the free webs 32a' of the U-shape are notched or toothed to allow bending of the cover band 42' around a transverse axis Q which extends in the band plane E and is perpendicular to the longitudinal direction A. The bending is required for example for deviating the cover band 42' in the region of the connection caps 38 or, as will be explained herein below with reference to FIG. 6, for mounting on the wagons 24.

Figure 5:
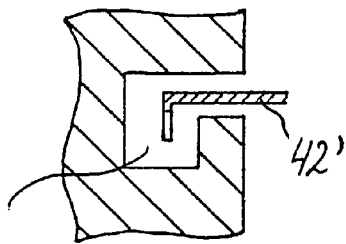
FIG. 5 is a view showing a partial section of the cover band of FIG. 4 in cooperation with a receiving guide groove.

The U-shaped construction of the cover band 42 has the advantage that it provides the increase of the stability of the cover band 42', in particular an increase of its guiding stability in the longitudinal grooves 18'a or 40'a of the edge flanges 18 of the guide housing 12 and the cover profile 40, as shown in FIG. 5. In particular, with the corresponding construction of the longitudinal grooves 18'a and 40'a with a form-locking cooperation of these longitudinal grooves with the cover band 42', the cover band will not be able to move out of the longitudinal grooves.

Figure 6:
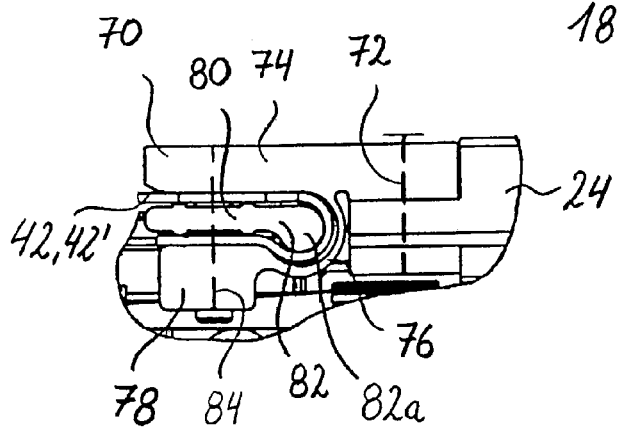
FIG. 6 is a detailed view of the linear guide unit for illustration of mounting of the cover band on a wagon.

FIG. 6 shows a mounting unit 70 which is used for mounting of the cover bands 42 and 42' on the wagon 24. With the use of the mounting unit 70, the base part 74 which is mounted by a screw bolt 72 on the wagon 24 is formed of one piece with the mounting or clamping part 78 via an elastic web 76. The elastic web 76 serves as a protection from losing of the clamping part 78 and allows turning on the clamping part 78 from the base part 70 for facilitating the insertion of the cover band 42 into an intermediate space 80 formed between the base part 74 and the clamping part 78. Preferably the free ends of the cover band 42 can be placed around a support part 82. The support part 82 can cooperate in a form-locking manner with a bolt 84 which mounts the clamping part 78 on the base part 74. This increases the clamping efficiency based on the placement of the cover band 42 around the support part 82 and facilitates the accompanying doubling of the clamping points. On the other hand, the support part 82 has an increased head 82a which, with applying a pulling stress on the cover band 42, additionally form-lockingly opposes a movement out of the gap 80.

Figure 7:
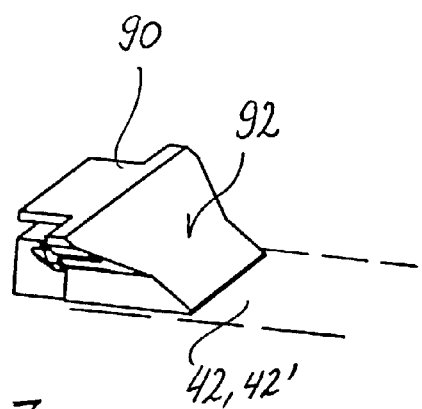
FIG. 7 is a view showing a stripping element for cleaning the cover band of the inventive linear guide unit.

Finally, in the region of the connection cap 38 and in particular at the side identified in FIG. 1 with reference numeral 1, a stripping element 90 is provided as shown in FIG. 7. The stripping element 90 is set with an inclined face 92 against the surface of the cover band 42 and 42' to strip dirt located on the cover band 42. The stripping element 20 can be pre-stressed at the lower side which faces the cover band 42 and 42', by a sealing element. The sealing element can be composed for example of felt and increases the stripping action of the inclined face 92.

It will be understood that each of the elements described above, or two or more together, may also find a useful application in other types of constructions differing from the types described above.

While the invention has been illustrated and described as embodied in linear guide units, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A linear guide unit, comprising an elongated guide housing having a longitudinal axis and walls which limit a guide hollow space and have free ends which limit at least one longitudinal opening of said guide hollow space; two guide rails provided in said guide hollow space each for displaceably guiding a wagon in direction of said longitudinal axis; a connecting unit which connects said wagons to a wagon arrangement; a connection part extending through said longitudinal opening for connection each of said wagons to an object to be guided in direction of said longitudinal axis; a cover element arranged between a movement path of said connection parts, is mounted on said guide housing and covers said longitudinal opening, and a support unit which is displaceable in direction of said longitudinal axis and located relative to said wagon arrangement in a position selected from the group consisting of a forwardly of, rearwardly of and both forwardly and rearwardly of said wagon arrangement, said supporting unit supporting said cover element relative to at least one element selected from the group consisting of said guide housing and said wagon arrangement.

2. A linear guide unit as defined in claim 1; and further comprising at least one sliding element located between at least one of said support units and said cover element.

3. A linear guide unit as defined in claim 1; and further comprising a drive device for moving said wagon arrangement in direction of said longitudinal axis, said driving device including a rod unit which is at least bringable into a driven alternating action with said wagon arrangement.

4. A linear guide unit as defined in claim 3, wherein said rod unit is formed as a threaded spindle of a roll body thread drive.

5. A linear guide unit as defined in claim 3; and further comprising a support arrangement, said support unit being associated with said support arrangement in a manner selected from the group consisting of being connected with said support arrangement and being formed of one piece with said support arrangement, said support arrangement being provided for supporting said rod unit relative to said guide housing.

6. A linear guide unit as defined in claim 1, wherein said support unit in a section which is perpendicular to said longitudinal axis has a substantially T-shaped construction.

7. A linear guide unit as defined in claim 6, wherein said support unit has a transverse web with free ends which engage in associated grooves of said cover element.

8. A linear guide unit as defined in claim 7, wherein said free ends of said transverse web form-lockingly engage in said associated grooves of said cover element.

9. A linear guide unit as defined in claim 7; and further comprising a slide element provided on said support unit at a location selected from the group consisting of at an upper side, at a lower side, and at least a free end of said transverse web of said support unit.

10. A linear guide unit as defined in claim 1, wherein said cover element is held between said connection units with pulling stress.

11. A linear guide unit as defined in claim 1; and further comprising at least one stripping unit, said stripping unit being arranged on one of said connection unit of said guide housing.

12. A linear guide unit as defined in claim 1; and further comprising at least one stripping unit, said stripping unit being arranged on one of said connection unit of said guide housing.

* * * * *